W. EHRLICH.
BACK PRESSURE UNLOADING VALVE.
APPLICATION FILED JULY 30, 1917.
1,321,901. Patented Nov. 18, 1919.
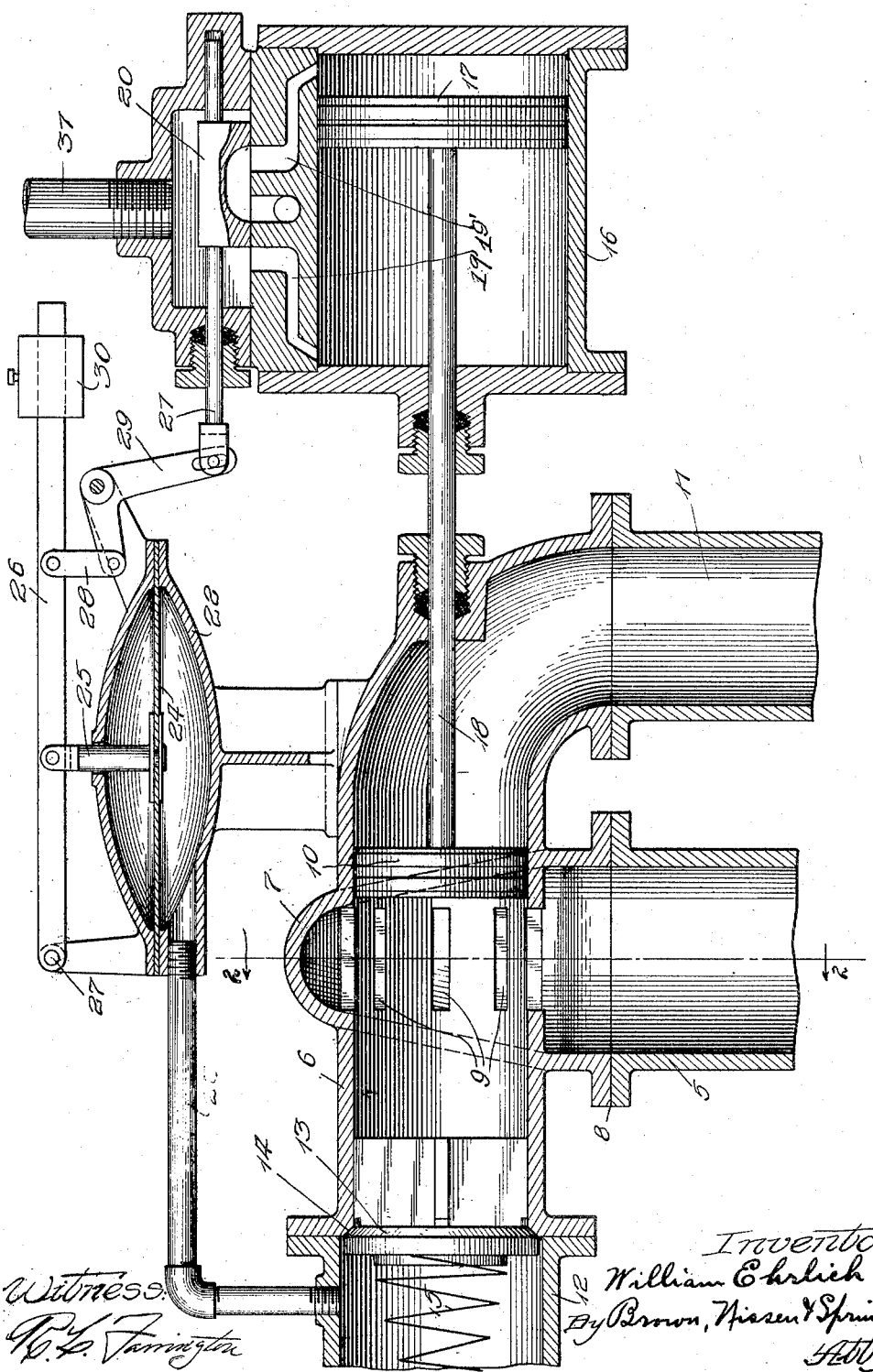

UNITED STATES PATENT OFFICE.

WILLIAM EHRLICH, OF CHICAGO, ILLINOIS.

BACK-PRESSURE-UNLOADING VALVE.

1,321,901.      Specification of Letters Patent.      Patented Nov. 18, 1919.

Application filed July 30, 1917. Serial No. 183,473.

*To all whom it may concern:*

Be it known that I, WILLIAM EHRLICH, a citizen of the United States, residing at Chicago, in the county of Cook and State of Illinois, have invented certain new and useful Improvements in Back-Pressure-Unloading Valves, of which the following is a specification.

My invention relates to valve mechanism for relieving engines, and the like, from back pressures.

The object of my improvement is the production of simple and efficient means for automatically directing a portion of the exhaust fluids of engines, and the like, into heating systems, or other containers, and then directing the remainder of such exhaust fluids into the atmosphere at substantially atmospheric pressure to obtain the maximum effect of fuels consumed.

Other objects will appear hereinafter.

Embodiments of my invention are shown in the accompanying drawings, forming a part of this specification, and in which—

The figure is a longitudinal section taken through a device embodying my invention.

Referring more particularly to the drawing, I have shown the end of a pipe 5 which is intended to designate the exhaust pipe or port of a steam engine, internal combustion engine, hot air engine, or the like. My device is capable of use in connection with the exhaust of all of the ordinary forms of engines, steam engines being the most preferable. Connected with the pipe 5 is a cylindrical fitting 6, having an enlargement 7 thereon, which is connected as at 8, to said member 5. The enlargement 7 is hollow and communicates with the interior of fitting 6 by long narrow ports 9.

Reciprocally mounted in the member 6 is a piston head 10, which is preferably of a thickness corresponding to one-half the length of ports 9. However, the ports 9 may be made of other relative lengths with respect to the thickness of the piston without departing from my invention. One end of the fitting 6 opens into the atmosphere through a pipe 11, and the other end is connected with a pipe end 12, which is preferably the receiving end of a heating system, or other suitable container, in which it is desired to utilize exhaust fluids from engines. In the fitting 6 at its opening into pipe end 12, I provide a check valve 13, seated on a seat 14, and held thereagainst by a spring 15.

I provide an operable means for operating and holding the piston head 10. Any form of fluid operable means desirable may be employed. In the form indicated I have shown an ordinary slide valve reciprocating steam engine construction which embodies a cylinder 16, piston 17, piston rod 18, which is connected with the piston head 10, ports 19 and 19′, slide valve 20, and an operating stem 21 for said slide valve.

The valve 20 is preferably operated by a suitable means which is controlled by pressure from the heating system pipe 12. In the embodiment shown, I have indicated a diaphragm housing 22, connected with the pipe 12 by means of a pipe 23. In the diaphragm housing 22 I have provided a diaphragm 24, which has a stem 25 extending out through the top of the housing 22, and connected with a lever 26. The lever 26 is pivoted as at 27 on a suitable part of the housing 22. The lever 26 is connected by means of a link 28 and lever 29 with the valve stem 21, so that the movements of the diaphragm will operate the valve 20. A weight 30 is adjustably secured on the lever 26 in a manner so that it may be adjusted on the lever 26 to cause the diaphragm 24 to be operated at different pressures in the heating system.

In the operation of this device, exhaust fluids from an engine pass through the pipe end 5, through the enlargement or housing 7 and ports 9 into the fitting 6. When the piston head 10 is in the position shown in Fig. 1, such exhaust fluids will be forced by valve 13 into the pipe end 12, and when sufficient pressure has been accumulated in pipe 12, such pressure will raise the diaphragm 24 against the influence of weight 30, and through the members 25, 26, 28, 29 and 21 move the valve 20 and uncover port 19′. This will permit the fluid from pipe 31 to pass through port 19′ and move the pistons 17 and 10 to their other terminal of movement, which will bring the piston 10 to the other ends of the ports 9 in member 6. This movement of piston head 10 will cause the exhaust fluids to pass from pipe end 5 through member 7 and ports 9 into member 6, and then out through pipe end 11 to the atmosphere. The movement of piston 17 will be accomplished quickly when the fluids from pipe 31 engage such piston head. When the fluids in pipe 12 and housing 22 have contracted sufficiently to permit the weight 30 to press the diaphragm 24 downwardly again, the movement of lever 26 downwardly will move the valve 20 back to the position indicated in Fig. 1. This movement of valve 20 to uncover the port 19 will permit fluids from pipe 31 to pass through port 19 into the cylinder 16 and move the pistons 17 and 10 back to the positions indicated in Fig. 1. This will again permit the exhaust fluids from pipe end 5 to pass into the pipe end 12. From this it will be seen that when the exhaust fluids are not needed in the heating system that such exhaust fluids are caused to exhaust directly into the air against atmospheric pressure only, thereby relieving the engine from operating against the back pressure carried in the heating system. In this manner maximum energy may be utilized from the fuel without loss from operating against back pressures on such engine.

I claim:—

1. In combination, a fitting having an outlet opening at each end and a cylindrical bore intermediate its ends with a plurality of narrow inlet ports extending longitudinally of the fitting and disposed around the inner wall and intermediate the ends of said cylindrical bore; a piston valve in and fitting said cylindrical bore; a casing extending around said fitting with all of said inlet ports opening into the interior of said casing; an engine exhaust port connected with said casing; a heating system connected with one of said outlet openings, the other outlet opening being connected with the outside atmosphere; a diaphragm chamber connected with the heating system; a diaphragm in the diaphragm chamber adapted to be raised by fluid from the heating system; a weighted lever connected with said diaphragm and adapted to lower the latter; and a fluid operable motor connected with said piston valve for moving the latter across the intake ports of said fitting, the fluid motor having a control valve connected with said lever for operating said control valve.

2. In combination, an engine exhaust port; a fitting having an inlet opening connected with said exhaust port and two outlet openings; a heating system connected with one of the outlet openings, the other outlet opening opening into the atmosphere; a piston valve reciprocally mounted in said fitting and adapted to control the discharge of fluid from said outlet openings; a cylinder; a piston in said cylinder connected with the above-mentioned piston valve; a valve for admitting a working fluid to said cylinder; a diaphragm connected with said last-mentioned valve; a weight connected with the diaphragm for moving the last-mentioned valve in one direction; and means for directing a fluid from the heating system to the diaphragm for moving said last-mentioned valve in the other direction.

In testimony whereof I have signed my name to this specification, on this 19th day of July A. D. 1917.

WILLIAM EHRLICH.